March 17, 1964 T. M. LAAKSO ET AL 3,125,550
QUATERNARY SALTS OF C-VINYLPYRIDINE POLYMERS WITH
COMPOUNDS CONTAINING A HALOACETYL GROUP
Original Filed Sept. 3, 1957
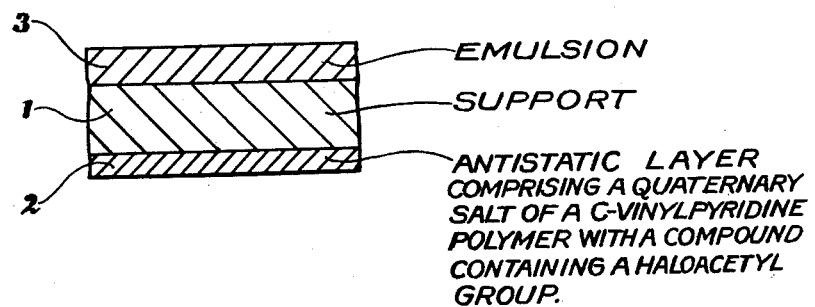
Thomas M. Laakso
Jack L. R. Williams
Calvin S. Garber
INVENTORS
BY R. Frank Smith
Leonard E. Brancken
ATTORNEY & AGENT United States Patent Office 3,125,550
Patented Mar. 17, 1964

3,125,550
QUATERNARY SALTS OF C-VINYLPYRIDINE POLYMERS WITH COMPOUNDS CONTAINING A HALOACETYL GROUP
Thomas M. Laakso, Jack L. R. Williams, and Calvin S. Garber, Rochester, N.Y., assignors to Eastman Kodak Company, Rochester, N.Y., a corporation of New Jersey
Original application Sept. 3, 1957, Ser. No. 681,601. Divided and this application Dec. 23, 1960, Ser. No. 77,904
6 Claims. (Cl. 260—65)

This invention relates to slats of vinylpyridine polymers and more particularly to quaternary salts of C-vinylpyridine polymers with certain organic compounds containing a halogen-substituted acetyl group and more especially a chloroacetyl group, to materials prepared therewith, and to processes for preparing such polymeric salts and materials.

This is a division of our copending application Serial No. 681,601, filed September 3, 1957, now Patent No. 2,972,335, issued February 21, 1961.

The new class or resinous polymers of the invention are derived from C-vinylpyridine polymers by reaction with certain quaternizing agents in such proportions that the resulting polymer consists from 70 to approximately 100% by weight in linear combination of recurring quarternized units represented by the following general structure:

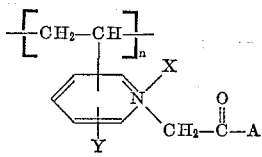

wherein $n$ represents a whole number and indicates the unit recurs, Y represents an atom of hydrogen or an alkyl group of 1 to 4 carbon atoms, X represents a halogen atom such as chlorine or bromine, and A represents a member selected from the group consisting of —R which represents an alkyl group of 1 to 4 carbon atoms, a phenyl group of a substituted phenyl group e.g. methyl, ethyl, propyl, isopropyl, butyl, phenyl, monohydroxyphenyl, dihydroxyphenyl, acetamidophenyl, etc. groups, an alkoxy group —$OR_1$ wherein $R_1$ represents an alkyl group of from 1 to 24 carbon atoms e.g. methyl, ethyl, propyl, isopropyl, butyl, pentyl, hexyl, decyl, dodecyl, hexadecyl, octadecyl, nonadecyl, eicosyl, heneicosyl, behenyl, carnaubyl, etc. groups, and an amino group —$NR_2R_3$ wherein $R_2$ represents a hydrogen atom or an alkyl group of 1 to 4 carbon atoms and $R_3$ represents a hydrogen atom, or an alkyl group of 1 to 4 carbon atoms or a phenyl group. The above-defined polymeric quaternary salts are film-forming and have numerous uses, but are particularly valuable as antistatic coatings on sheet materials such as light-sensitive photographic films to prevent static markings and other defects produced by friction in the manufacture, use and processing of the same. Each of the classes of compounds coming within the above structure have their own individual characteristics as to their antistatic efficacy. Thus, a particular species may be preferred for one type of photographic application whereas for a different photographic application another species may be more adapted. They are also efficacious antistatic coating materials for thin wrapping materials especially for those wherein the sheet material is a cellulose organic ester.

It is accordingly, an object of this invention to provide a new class of polymeric compounds. A more specific object is to provide new polymeric salts. Another object is to provide sheet materials that are antistatic in character and more particularly photographic films that are static resistant. Another object is to provide processes for preparing such polymeric salts and coated materials prepared therewith. Other objects will become apparent hereinafter.

In accordance with the invention, we prepare the polymeric quaternary salts which consist of from 70 to approximately 100% by weight in linear combination of recurring quaternized units of the following general structure:

(I) 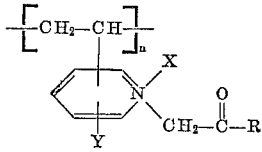

wherein $n$, Y, X and R are as above defined, the remainder of the polymer molecule being residual C-vinylpyridine units, by reacting a resinous C-vinylpyridine polymer with a haloketone, in a solvent medium such as methanol, ethanol, dioxane, etc., at an elevated temperature but preferably at or near the reflux temperature of the reaction mixture, until the resulting viscous dope is completely water-soluble, and then isolating the polymeric salt by precipitating the solution into a larger volume of a non-solvent such as diethyl ether, petroleum ether, etc., followed by filtering and drying the polymeric salt. The proportions of the reacting components can vary from equimolar quantities to an excess of one or the other, but preferably the haloketone component is used in substantial excess. Typical haloketones that can be used advantageously in the above reaction include halogen substituted ketones such as chloroacetone, bromoacetone, chloromethyl ethyl ketone, bromoethyl ethyl ketone, α-chloroacetophenone, p-chloroacetophenol, p-chloroacetylacetanilide, chloroacetopyrocatechol, etc., and the corresponding bromine derivatives wherein a bromine atom replaces the chlorine atom in each instance. The polymeric salts prepared with the haloketones wherein R is an alkyl group are outstanding in antistatic characteristics and are preferred.

To obtain the polymeric quaternary salts of the invention which consist of from 70 to approximately 100% by weight in linear combination of recurring quaternized units of the following general structure:

(II) 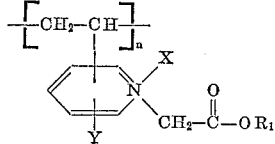

wherein $n$, Y, X and $R_1$ are as above defined, the remainder of the polymer molecule being residual C-vinylpyridine units, by reacting a resinous C-vinylpyridine polymer with an alkyl ester of chloroacetic or bromoacetic acid, under conditions that are generally similar to those set forth for the preparation of the polymeric salts represented by above structure I. Typical alkyl esters of chloroacetic and bromoacetic acids that can be used advantageously include methyl chloroacetate, ethyl chloroacetate, propyl chloroacetate, isopropyl chloroacetate, the butyl chloroacetates, the hexyl chloroacetates, the decyl chloroacetates, the dodecyl chloroacetates, the hexadecyl chloroacetates, the octadecyl chloroacetates the eicosyl chloroacetates, the carnaubyl chloroacetates, etc. and the corresponding esters of bromoacetic acid. In general, the normal alkyl esters are preferred. The above-mentioned esters can be prepared by reacting chloroacetyl chloride or bromoacetyl chloride with the appropriate saturated monohydroxy alkanol, or by reacting chloroacetic or bromoacetic acid with the alkanol in the presence of a catalyst such as sulfuric acid, preferably in an inert reaction medium such as benzene and separating the product therefrom by distillation or by other conventional separation methods. The polymeric salts of this group all have outstanding anti-static characteristics.

To obtain the polymeric quaternary salts of the invention which consist of from 70 to approximately 100% by weight in linear combination of recurring quaternized units of the following general structure:

(III)

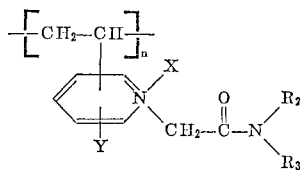

wherein $n$, Y, X, $R_2$ and $R_3$ are as above defined, the remainder of the polymer molecule being residual C-vinylpyridine units, by reacting a resinous C-vinylpyridine polymer with a halogen-containing amine compound having the formula $XCH_2CONR_2R_3$, under conditions that are generally similar to those set forth for the preparation of the polymeric salts represented by above structure I. Typical halogen-containing amine compounds that can be used advantageously include chloroacetamide, α-chloro-N-methylacetamide, α-chloro-N-butylacetamide, α-chloro-N,N-diethylacetamide, α-chloro - N - ethylacetanilide, α-chloro-N-butylacetamide, α-chloro-N-phenylacetamide (α-chloroacetanilide), α-chloro-N-ethylacetamide (α-chloro-N-ethylacetanilide), etc. and the corresponding bromine substituted acetamides. While all of the polymeric salts obtained by the above process have excellent antistatic characteristics, those prepared with chloroacetamide, bromoacetamide and the N-alkyl and N,N-dialkyl derivatives thereof are outstanding and are preferred.

The intermediate C-vinylpyridine polymers employed for the preparation of the polymeric salts of structures I, II and III may be prepared by conventional polymerization methods wherein a monomer such as 2-vinylpyridine, 3-vinylpyridine, 4-vinylpyridine, 2-methyl-5-vinylpyridine, etc. is heated in the presence of a polymerization catalyst such as benzoyl peroxide, acetyl peroxide, hydrogen peroxide, ammonium persulfate, potassium persulfate, etc., in mass, in solution in an inert organic solvent or polymerizing in emulsion form in a non-solvent such as water, the resulting polymers being separated from the polymerization reaction mixture by conventional means such as precipitating or coagulating, filtering, washing and drying. If desired, the intermediate polymers may be copolymers of the above-mentioned C-vinylpyridines with a lesser quantity by weight of certain other polymerizable monomers such as styrene, acrylic acid esters and amides including N-alkyl amides, and α-alkyl substituted acrylic esters and amides including N-alkyl amides, e.g. methyl acrylate, methyl methacrylate, acrylamide, N-methyl acrylamide, N-methyl methacrylamide, N,N-dimethyl acrylamide, etc. However, the polymeric quaternary salts of the invention prepared from the homopolymers of C-vinylpyridines are preferred.

The accompanying drawing is a sectional view of a photographic film base 1 composed of a hydrophobic material such as a cellulose derivative, e.g., cellulose acetate, cellulose propionate, cellulose acetate-butyrate, cellulose nitrate, etc., a polyamide such as nylon, a polyester such as polyethylene terephthalate, polycarbonates, polyethylenes, polypropylenes, and the like, has coated thereon a polymeric salts of the invention as layer 2, and on the opposite side a layer 3 of a light-sensitive material, e.g., a gelatine-silver halide emulsion. The layer 2 of the polymeric salt may also have therein a substantial proportion of gelatine, if desired. Although the preferred method of employing the polymeric salts of the invention is in the form of a backing layer as shown in the drawing, the polymeric salt of the invention as layer 2, and on the sensitive emulsion layer or used as an overcoating layer over the sensitive emulsion layer to give antistatic properties to the photographic film. However, as indicated in the drawing, application of the polymeric salts to the back of the film, i.e., to the opposite side from that of the sensitive emulsion layer, is preferred.

The following examples will serve to illustrate further the preparation of the polymeric salts of the invention and the application of the same to the product of light-sensitive films having excellent antistatic properties.

EXAMPLE 1

323 g. (3.07 moles) of poly-4-vinylpyridine [$\{n\}=1.22$] were dissolved in 2000 cc. of methyl alcohol by stirring at room temperature. Then, there were added to the viscous solution 420 g. (4.5 moles) of chloroacetone, and the mixture was heated at reflux temperature for 24 hours, after which time the dope was completely water-soluble. After dilution with 1 liter of methyl alcohol, the resulting quaternary salt was precipitated from solution in several volumes of diethyl ether. The brittle, light-buff colored solid was leached with 2 changes of ether and dried over $P_2O_5$ at reduced pressure. The yield of product was 535 g. equivalent to about 88% of the theoretical value. Analysis of this product showed that it contained by weight 57.8% of carbon, 6.2% of hydrogen 7.5% of nitrogen and 16.8% of chlorine compared with calculated for $C_{10}H_{12}NOCl$ of 60.7%, 6.0%, 7.1% and 17.9%, respectively. This result indicated that the product consisted of approximately 87% by weight of the following structure:

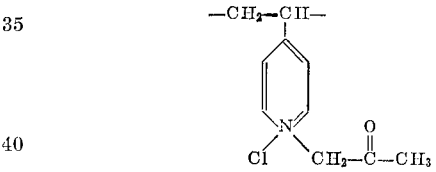

the remainder of the polymer molecule being residual recurring 4-vinylpyridine units. This product showed excellent antistatic characteristics when coated on thin wrapping materials and photographic films.

In place of the chloroacetone in the above example, there may be substituted an equivalent amount of related compounds, e.g. bromoacetone, α-chloroacetophenone, α-bromoacetophenone or nuclear substituted α-chloro or α-bromoacetophenones wherein the substituent on the phenyl nucleus is an alkyl group of 1 to 4 carbon atoms, a halogen atom, a hydroxyl group, an amino group, an acetamido group, etc., to give the corresponding polymeric quaternary salt products having generally similar properties. Also, in place of the poly-4-vinylpyridine in the above example, there may be substituted a like amount of poly-2-vinylpyridine or any other of the mentioned C-vinylpyridine polymers, the reaction therewith being carried out with any of the quaternizing agents mentioned in the example, to give products having generally similar properties.

The above described polymers are capable of further modification by condensation through the carbonyl group with various hydrazones, oximes, hydrazides, semicarbazones and aldehydes. This kind of process may be better undrestood by reference to copending applications of T. M. Laakso and J. L. R. Williams, Serial No. 681,603 and Serial No. 681,604 filed of even date herewith, wherein the preparation of certain hydrazide derivatives of the polymeric salt products of the above example are described.

EXAMPLE 2

25 g. (0.238 mole) of poly-4-vinylpyridine were dissolved in 450 cc. of methanol by stirring at room temperature. Then 80 g. (0.38 mole) of p-chloroacetylacetanilide slurried in 250 cc. of methanol were added. This mixture was heated until a test portion of clear, filtered reaction solution was completely soluble in water. The main portion of the viscous solution was filtered to remove the unreacted quaternizing agent. The clear, viscous filtrate was precipitated into 4 liters of diethyl ether, the precipitate of polymeric salt was separated, leached with fresh ether and dried at reduced pressure. A yield of 74.5 g., equivalent to 97% of theoretical value of the polymeric salt product was obtained. Analysis showed that it contained by weight 59.6% of carbon, 6.1% of hydrogen, 8.1% of nitrogen and 11.5% of chlorine compared with calculated for $C_{17}H_{17}N_2O_2Cl$ of 65.0%, 5.4%, 8.9% and 11.2%, respectively. This result indicated that the product was essentially 100% poly-4-vinylpyridinium-p-chloroacetylacetanilide consisting of recurring units of the following structure:

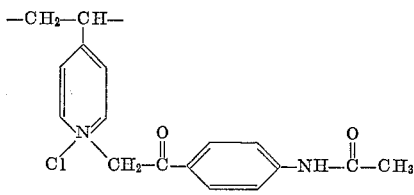

The product showed good antistatic properties.

In place of the poly-4-vinylpyridine in the above example, there may be substituted a like amount of poly-2-vinylpyridine or any other of the mentioned C-vinylpyridine polymers. Also, the p-chloroacetylacetanilide in the above example may be substituted by an equivalent amount of p-bromoacetylacetanilide. These additional products likewise show satisfactory antistatic properties when coated on thin wrapping materials and photographic films.

EXAMPLE 3

21 g. (0.2 mole) of poly-4-vinylpyridine beads $[\{n\}=1.22]$ were dissolved in 600 cc. of dimethylformamide. To this solution, there were added 40 g. (0.21 mole) of chloroacetopyrocatechol in 100 cc. of dimethylformamide. After standing at 25° C. for 24 hours, the reaction mixture was water-soluble. The polymeric salt was isolated by precipitating the mixture into diethyl ether, followed by filtering, washing and drying the precipitated product. A yield of 55 g. of an amber-colored product equivalent to 95% of theory was obtained. Analysis showed that the product contained by weight 61.7% of carbon, 4.8% of hydrogen, 4.8% of nitrogen and 12.2% of chlorine compared with calculated for $C_{15}H_{14}NClO_3$ of 60.2%, 6.0% 7.9% and 9.7% respectively. On the basis of the chlorine content, this result indicates that the product, poly-4-vinylpyridinium chloroacetopyrocatechol, consisted of approximately 80% by weight of recurring units of the following structure.

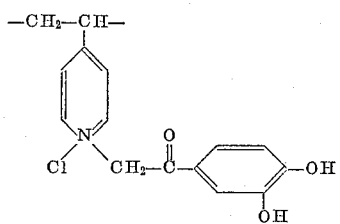

The remainder of the polymer molecule being residual recurring 4-vinylpyridine units.

In place of the poly-4-vinylpyridine in the above example, there may be substituted a like amount of poly-2-vinylpyridine or any other of the mentioned C-vinylpyridine polymers to give generally similar polymeric salt products. Also, the chloroacetopyrocatechol in the above example, may be substituted by related quaternizing agents such as chloroacetoresorcinol, p-chloroacetophenol, etc. and by corresponding bromo derivatives. In addition to their antistatic properties, these polymeric salts function also as non-diffusable photographic developers, as polymeric color couplers and mordants, as well as antistain, dispersing and wetting agents. For example, an aqueous solution of poly-4-vinylpyridinium chloroacetopyrocatechol reduced freshly prepared Tollens reagent (an ammoniacal solution of silver oxide), and produced deep colors with various color developers using hydrogen peroxide as oxidizing agent.

The physical properties of the above polymeric quaternary salts may be adjusted by degree of quaternization or by selecting suitable starting copolymers of the C-vinylpyridines such as previously mentioned. These polymeric quaternary salts are further capable of modification through the functional groups, for example, insolubilization by a cross-linking reaction with formaldehyde, bismethanesulfonoxy derivatives of polyglycols, bis developers, bis azides, and bis diazonium coupling agents.

EXAMPLE 4

323 g. (3.07 moles) of poly-4-vinylpyridine $[\{n\}=1.22]$ were dissolved in 2000 cc. of methanol by stirring at room temperature. To this viscous solution, there were added 555 g. (4.5 moles) of ethyl chloracetate, and the mixture heated at reflux temperature for 24 hours, after which time the dope was completely water-soluble. After dilution with 1 liter of methanol, the quaternary salt was precipitated from solution in several volumes of diethyl ether. The brittle, light-buff colored solid obtained was leached in two changes of ether and dried over $P_2O_5$ at reduced pressure. The yield of product was 585 g. or approximately 84% of the theoretical amount. Analysis showed that this product contained by weight 55.4% of carbon, 6.6% of hydrogen, 6.7% of nitrogen and 15.3% of chlorine compared with calculated for $C_{11}H_{14}O_2NCl$ of 58.4%, 6.1%, 6.1% and 15.6% respectively. This result indicated that the product was essentially poly-4-vinylpyridinium ethylchloroacetate consisting of recurring units of the following structure:

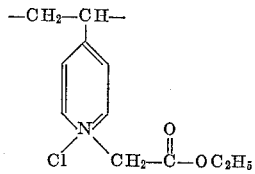

This product showed excellent antistatic properties when coated on thin wrapping materials and photographic films.

In place of the poly-4-vinylpyridine in the above example, there may be substituted a like amount of poly-2-vinylpyridine or any other of the mentioned C-vinylpyridine homopolymers and copolymers to give resinous products having generally similar properties.

EXAMPLE 5

100 g. (0.94 mole) of poly-4-vinylpyridine $[\{n\}=1.28]$ were dissolved in 800 cc. of methanol at room temperature. Then 225 g. (1.5 moles) of n-butyl chloroacetate were added to the viscous solution and this mixture was heated at 50–55° C., until it became water-soluble (about 24 hours). The resulting quaternary salt was precipitated from solution in 4 liters of diethyl ether. The brittle, amber-colored solid obtained was leached in 2 changes of fresh ether and dried over $P_2O_5$ at reduced pressure. The yield of poly-4-vinylpyridinium n-butyl chloroacetate was 205 g. or equivalent to 84.7% of the theoretical value. It showed satisfactory antistatic properties when coated on thin wrapping materials and photographic films.

EXAMPLE 6

100 g. (0.95 mole) of poly-4-vinylpyridine and 183 g. (1.1 moles) of ethylbromoacetate were reacted together in 750 cc. of methanol by warming at 50° C. until a water-soluble product was obtained. The product was isolated by precipitating into 5 liters of diethyl ether followed by filtering, leaching in fresh ether, and drying. A yield of 257 g. equivalent to 96.5% of theory of the quaternary salt was obtained. Analysis of this product showed that it contained by weight 47.8% of carbon, 5.5% of hydrogen, 5.2% of nitrogen, and 25.8% of bromine compared with calculated theory for $C_{11}H_{14}O_2NBr$ of 48.5%, 5.1%, 5.1%, and 29.4% respectively. No conductivity data were available at this time. This result indicates that the product consisted of approximately 88% by weight of recurring 4-vinylpyridinium ethyl bromoacetate units and 12% by weight of residual recurring 4-vinylpyridine units. The product showed excellent antistatic properties when coated on thin wrapping materials and photographic films.

EXAMPLE 7

47.8 g. (0.4 mole) of poly-2-methyl-5-vinylpyridine and 90.7 g. (0.54 mole) of ethylbromoacetate were reacted together in 200 cc. of methanol in similar manner as described in above Example 6. A yield of 85% of the quaternary salt product was obtained. It consisted of approximately 90% by weight of recurring 2-methyl-5-vinylpyridinium ethyl bromoacetate units and 10% by weight of residual recurring 2-methyl-5-vinylpyridine units. The product showed satisfactory antistatic properties when coated on thin wrapping materials and photographic films.

EXAMPLE 8

270.5 g. (1 mole) of 1-octadecanol and 94.5 g. (1 mole) of chloroacetic acid in 1 liter of benzene plus 1 drop of $H_2SO_4$ were refluxed 16 hours in a 3-liter, 3-necked flask equipped with an 18-inch glass column topped by an esterification head, and a stirrer and heated by an immersion electric heater. After this interval, the benzene layer was separated, washed with water and then with sodium carbonate solution, followed by final washing with water. The benzene was removed by fractional distillation leaving a residual oil which after fractionation had a B.P. 210–215° C. at 1 mm. pressure. The colored distillate crystallized to a white solid M.P. 30–32° C. A yield of 320 g. equivalent to 92% of theory was obtained. Analysis showed that this product contained by weight 69.6% of carbon, 11.5% of hydrogen and 10.4% of chlorine compared with calculated for $C_{29}H_{39}O_2Cl$ of 69.3, 11.2 and 10.2%, respectively. This result indicated that essentially pure n-octadecyl chloroacetate had been obtained.

53 g. (0.5 mole) of poly-4-vinylpyridine and 175 g. (0.5 mole) of n-octadecyl chloroacetate prepared as above were refluxed with stirring in 1500 cc. of methanol on a steam bath for 72 hours. The resulting dark-colored solution was precipitated into three volumes of diethyl ether, leached with fresh ether, redissolved in a minimum quantity of methanol, reprecipitated in ether and dried at room temperature under reduced pressure. A yield of 192 g. equivalent to 85% of product was obtained. Analysis showed that this product contained by weight 70.6% of carbon, 8.6% of hydrogen and 8.4% of chlorine compared with calculated for $C_{36}H_{46}NO_2Cl$ of 72.0%, 10.2% and 7.9%, respectively. This result indicated that a fully quaternized product, poly-4-1-octadecyl vinylpyridinium chloroacetate, consisted of essentially 100% of recurring units of the following structure:

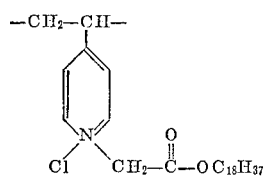

It showed excellent antistatic properties and greatly improved tackiness when coated on thin wrapping materials and photographic films as compared to the quaternary salts prepared with shorter chain alkyl chloroacetates. Thus, when coated from concentrations of 0.25%, 0.50% and 1.00% in a 60–40 methanol-acetone solution onto a cellulose acetate sheet material and tested from tackiness, the values obtained were less than 10, 10 and 15, respectively. Since a value of 50 or less is considered satisfactory for this test, it will be seen that the quaternary salt of this example has excellent tackiness characteristics. The test for tackiness is really a measure of relative adhesion wherein a roll of film is simulated, i.e. the coated surface is pressed tightly against a similar uncoated sheet of cellulose acetate, and the tension required to strip the films apart is taken as the measure of tackiness.

In place of the n-octadecyl chloroacetate in the above example, there may be substituted an equivalent amount of other long chain esters such as dodecyl, hexadecyl, eicosyl, carnaubyl, etc. esters of chloroacetic or bromoacetic acid. These esters may be prepared from the corresponding alcohols by reaction with the said acids as described in the above example. Also, the poly-4-vinylpyridine in the example may be substituted by a like amount of poly-2-vinylpyridine or any other of the mentioned C-vinylpyridine homopolymers and copolymers. However, the homopolymers are preferred. All of the products mentioned above have generally similar properties as the product of the example.

EXAMPLE 9

100 g. (0.94 mole) of poly-4-vinylpyridine [$n=1.28$] were dissolved in 800 cc. of methanol at room temperature. Then 178 g. (1.88 moles) of chloroacetamide were added to the viscous solution and this mixture was heated at 40–50° C., until it was water-soluble (usually in 24 hours), after which time the quaternary salt was precipitated from solution in 4 liters of diethyl ether. The brittle, amber-colored solid was leached in two changes of ether and dried over $P_2O_5$ at reduced pressure. A yield of 183 g. of 95% of theoretical of poly-4-vinylpyridinium chloroacetamide was obtained. Analysis of this product showed that it contained by weight 49.9% of carbon, 6.3% of hydrogen, 13.8% of nitrogen and 18.3% of chlorine compared with calculated for $$C_9H_{11}N_2OCl$$

of 54.5%, 5.5%, 14.1% and 17.9%, respectively. Accordingly, the product consisted essentially of recurring units of the following structure:

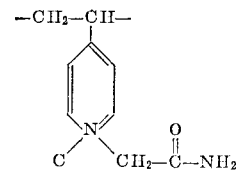

The product showed excellent antistatic properties when coated on thin wrapping materials and photographic films.

EXAMPLE 10

100 g. (0.95 mole) of poly-4-vinylpyridine [$n=1.38$] were dissolved in 750 cc. of methanol by stirring at room temperature. 150 g. (1 mole) of α-chloro-N,N-diethylacetamide were added to the viscous solution. This mixture was warmed in a steam bath until water-soluble. The viscous solution was precipitated into 4 liters of diethyl ether and the amber-colored polymer leached in fresh ether. The product was then dried at reduced pressure. The yield of polymeric quaternary salt product was 155 g. or 60.7% of the theoretical value. Analysis showed that this product contained by weight 63.1% of carbon, 7.1% of hydrogen, 10.7% of nitrogen and 10.2% of chlorine compared with calculated for $$C_{13}H_{19}N_2OCl$$

of 61.3%, 7.4%, 11.0% and 13.9%, respectively. This result indicated that the product, poly-4-vinylpyridinium- α-chloro-N,N-diethylacetamide, consisted of about 73% by weight of recurring units of the following structure:

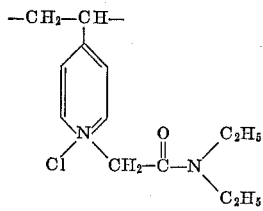

the remainder of the polymer molecule being residual recurring 4-vinylpyridine units. The product showed good antistatic properties when coated on thin wrapping materials and photographic films.

photographic films coated with the polymeric salts of the invention.

In each instance, the polymeric salt was dissolved in a mixture of acetone-water or a mixture of acetone-methanol in a concentration varying from about 0.062 to 2.000 percent by weight of the polymeric salt, and the solution was then applied as a backing to a sheet of cellulose acetate film base by means of a dip roller and dried. The film was then further coated on the reverse side with a suitable subbing layer and a gelatine-silver halide emulsion. The following table lists the polymeric salt, the solvent combination, the concentration of polymeric salt therein, the coverage of the coating, and the conductivity and appearance of the coated films.

Table

| Polymeric Salt | Antistatic Coating Composition | | | | Coated Film | | |
|---|---|---|---|---|---|---|---|
| | Solvent Combination—Wt. Ratios | | | Concentration Polymeric Salt, Wt. Percent | Antistatic Coating | | Appearance |
| | Acetone | Methanol | Water | | Coverage, micrograms/cm² | Conductivity × 10⁻¹ mho | |
| Product of Ex. 1 (Poly-1-acetonyl-4-vinylpyridinium chloride). | 35 | 65 | | 0.062 | 1.5 | 0.5 | clear. |
| | 35 | 65 | | 0.125 | 4.1 | 19.0 | Do. |
| | 35 | 65 | | 0.25 | 9.6 | 39.0 | Do. |
| Product of Ex. 2 (Poly-4-vinylpyridinium-p-chloro-acetylanilide). | 70 | 30 | | 0.5 | 2.2 | 0.15 | Do. |
| | 70 | 30 | | 1.0 | 5.9 | 2.0 | Do. |
| | 70 | 30 | | 2.0 | | 7.0 | Do. |
| Product of Ex. 4 (Poly-1-ethyl-4-vinylpyridinium chloroacetate). | 70 | 30 | | 0.25 | | 1.3 | Do. |
| | 30 | 70 | | 0.25 | | 5.9 | Do. |
| | | | 60 | 40 | 0.25 | | 5.6 | Do. |
| Product of Ex. 8 (Poly-1-octadecyl-4-vinylpyridinium chloroacetate). | 40 | 60 | | 0.25 | | 8.0 | Do. |
| | 40 | 60 | | 0.5 | | 19.0 | Do. |
| | 40 | 60 | | 1.0 | | 53.0 | Do. |
| Product of Ex. 9 (Poly-4-vinylpyridinium chloroacetamide). | 70 | 30 | | 0.25 | | 1.0 | Do. |
| | 30 | 70 | | 0.25 | | 1.5 | Do. |
| | | | 60 | 40 | 0.25 | | 1.2 | Do. |
| Product of Ex. 10 (Poly-4-vinylpyridinium-α-chloro-diethyl-acetamide). | 20 | 80 | | 0.25 | | 2.3 | Do. |
| | 20 | 80 | | 0.5 | | 9.1 | Do. |
| | 20 | 80 | | 1.0 | | 4.3 | Do. |
| | 70 | 30 | | 0.5 | | 0.4 | Do. |
| | 70 | 30 | | 1.0 | | 2.1 | Do. |
| | 70 | 30 | | 2.0 | | 91.0 | Do. |
| Product of Ex. 11 (Poly-4-vinylpyridinium-α-chloro-N-ethylacetanilide). | 70 | 30 | | 0.5 | | 1.3 | Do. |
| | 70 | 30 | | 1.0 | | 6.0 | Do. |
| | 70 | 30 | | 2.0 | | 18.0 | Do. |

EXAMPLE 11

25 g. (0.238 mole) of poly-4-vinylpyridine were dissolved in 150 cc. of methanol by stirring at room temperature. 75 g. (0.38 mole) of α-chloro-N-ethylacetanilide were added and the mixture heated in a 50° C. water bath until water-soluble. The viscous solution was precipitated into 4 liters of diethyl ether. The precipitated buff-colored polymer was then dried at reduced pressure. The yield of polymeric product was 56 g. or 79% of the theoretical value. Analysis of the product showed that it contained by weight 63.3% of carbon, 7.2% of hydrogen, 8.7% of nitrogen and 10.4% of chlorine compared with calculated for $C_{17}H_{19}N_2OCl$ of 67.4%, 6.3%, 9.2% and 11.7%, respectively. This result indicated that the product, poly-4-vinylpyridinum-α-chloro-N-ethylacetanilide, consisted of approximately 89% of recurring units of the following structure:

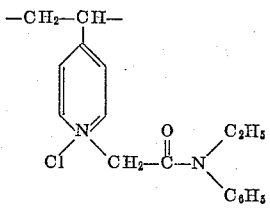

the remainder of the polymer molecule being residual recurring 4-vinylpyridine units. The product showed good antistatic properties when coated on thin wrapping materials and photographic films.

EXAMPLE 12

This example illustrates the antistatic properties of

Since conductivities of the order greater than $10^{-10}$ mhos have been found to alleviate difficulties from static electricity generated in the normal handling of photographic film, it will be seen from the above Table that by use of the polymeric salts of the invention in appropriate concentrations and solvent combinations as coatings, films can be prepared which are free from troublesome static effects.

The conductivity measurements for the above table were carried out by placing two parallel electrodes on the film at a fixed relative humidity of 50 percent; these electrodes are long compared to the distance between them, so as to avoid end effects. The observed reading is divided by the distance between electrodes and multiplied by their length, to obtain the surface resistivity in ohms, the conductivity being the reciprocal thereof.

While the polymeric salts of the invention have been illustrated primarily in connection with their use as antistatic coatings for light-sensitive photographic films, it will be understood that coatings thereof are also efficacious in the prevention of static build up and adhesion when coated on non-sensitized surfaces such as various natural and synthetic wrapping materials. Also, various fillers, dyes, softeners, etc. can be incorporated, if desired, into the coating compositions of the invention. In addition to these uses, the polymeric salts and coating compositions of the invention are also useful for rendering paper, textile materials, etc. antistatic by treatment therewith and are capable of functioning in many processes as wetting agents. Those polymeric salts that contain a hydroxyphenyl group are further useful as photographic developers, etc., for example, the poly-4-vinylpyridinium chloroacetopyrocatechol of Example 3. In general, the solubility of the polymeric salts of the invention vary in solubility depending upon the proportion of quaternary salt units contained therein, for example, they are methanol-soluble, water-insoluble at somewhat less than 70% by weight of quaternized units but methanol-soluble, water-soluble for the salts containing 70 to approximately 100% by weight of quaternized units.

The processes for preparing the resinous quaternary salts of the invention may also be modified to some extent. For example, instead of precipitating the viscous solution or dope obtained in the quaternizing reaction by pouring into a non-solvent such as diethyl ether, advantageously the solution may be siphoned through a tube (e.g. 8 mm. diameter) and run slowly into the non-solvent precipitating liquid, while mechanically shaking the end of the tube to form discrete droplets at the end of the tube, which then become transformed in falling through the precipitating liquid into porous half beads or granules of polymeric salt that are easy to filter, wash and store, and which are particularly well adapted for easy handling in subsequent uses of the polymeric salt beads or granules.

Although the invention is primarily concerned with the saturated polymeric salts which are the most advantageous for antistatic coatings, certain other polymeric salts of an unsaturated character also have good antistatic properties. The following example illustrates polymeric salts of the vinyl ester type.

EXAMPLE 13

50 g. (0.475 mole) of poly-4-vinylpyridine were dissolved in 250 cc. of methanol by stirring at room temperature. Then 90 g. (0.75 mole) of vinyl chloroacetate were added to the viscous solution and this mixture was heated at 40–50° C. for 24 hours, after which time the quaternary salt was precipitated from solution in 4 liters of diethyl ether. The brittle, amber solid was leached in two changes of ether and dried over $P_2O_5$ at reduced pressure. The yield of poly-4-vinylpyridinium vinyl chloroacetate was 70 g. or equivalent to 77% of the theoretical value. The conductivity measurements by the aforementioned method of Example 12 were as follows:

| Solvent Combination | | | Antistatic Coating | |
|---|---|---|---|---|
| Acetone | Methanol | Water | Coverage, micrograms/cm.² | Conductivity × 10⁻¹⁰ mho |
|  | 60 | 40 | 8.0 | 4.1 |
|  | 60 | 40 | 8.2 | 1.3 |
|  | 60 | 40 | 3.0 | 0.4 |
| 20 | 80 |  | 16.3 | 2.8 |
| 20 | 80 |  | 6.3 | 1.05 |
| 20 | 80 |  | 3.4 | 0.28 |
| 70 | 30 |  | 59 | 4.0 |
| 70 | 30 |  | 21 | 2.0 |

The above data indicate that the polymeric salt of this example provides adequate conductivity to furnish protection from static effects when coated onto the back side of film base.

In place of the vinyl chloroacetate in the above example, there may be substituted a like amount of other vinyl esters including vinyl chloropropionate, vinyl chlorobutyrate, etc. to give polymeric salts having generally similar antistatic properties.

What we claim is:

1. A quaternary salt of a resinous C-vinylpyridine polymer consisting of from 70 to approximately 100% by weight in linear combination of a recurring unit of the following general structure:

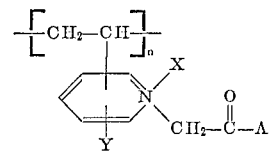

the remainder of the polymer molecule being residual recurring C-vinylpyridine units of the following general structure:

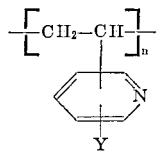

wherein $n$ represents a whole number, Y represents a member selected from the group consisting of a hydrogen atom and an alkyl group of 1 to 4 carbon atoms, X represents a halogen atom, and A represents a member selected from the group consisting of group —R which represents a member selected from the group consisting of an alkyl group to 1 to 4 carbon atoms, a phenyl group, a hydroxyphenyl group wherein the hydroxyl groups do not exceed 2, an acetamidophenyl group, an —$OR_1$ group wherein $R_1$ represents an alkyl group of 1 to 24 carbon atoms and an —$NR_2R_3$ group wherein $R_2$ represents a member selected from the group consisting of a hydrogen atom and an alkyl group of 1 to 4 carbon atoms, and $R_3$ represents a member selected from the group consisting of a hydrogen atom, an alkyl group of 1 to 4 carbon atoms and a phenyl group.

2. A quaternary salt of a resinous C-vinylpyridine polymer consisting of from 70 to approximately 100% by weight in linear combination of recurring units of the following structure:

$$-\!\!\left[CH_2-CH\right]_n\!\!-$$
with 4-pyridinium, Cl⁻, $CH_2-C(=O)-CH_3$ the remainder of the polymer molecule being residual recurring 4-vinylpyridine units.

3. A quaternary salt of a resinous C-vinylpyridine polymer consisting of from 70 to approximately 100% by weight in linear combination of recurring units of the following structure:

$$-\!\!\left[CH_2-CH\right]_n\!\!-$$
with 4-pyridinium, Cl⁻, $CH_2-C(=O)-OC_2H_5$ the remainder of the polymer molecule being residual recurring 4-vinylpyridine units.

4. A quaternary salt of a resinous C-vinylpyridine polymer consisting of from 70 to approximately 100% by weight in linear combination of recurring units of the following structure:

$$-\!\!\left[CH_2-CH\right]_n\!\!-$$
with 4-pyridinium, Cl⁻, $CH_2-C(=O)-OC_{18}H_{37}$ the remainder of the polymer molecule being residual recurring 4-vinylpyridine units.

5. A quaternary salt of a resinous C-vinylpyridine polymer consisting of from 70 to approximately 100% by weight in linear combination of recurring units of the following structure:

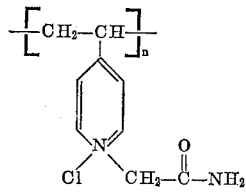

the remainder of the polymer molecule being residual recurring 4-vinylpyridine units.

6. A quaternary salt of a resinous C-vinylpyridine polymer consisting of from 70 to approximately 100% by weight in linear combination of recurring units of the following structure:

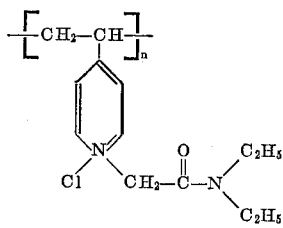

the remainder of the polymer molecule being residual recurring 4-vinylpyridine units.

References Cited in the file of this patent
UNITED STATES PATENTS
2,771,462   Shen _____ Nov. 20, 1956